(12) United States Patent
Laird et al.

(10) Patent No.: US 10,021,365 B2
(45) Date of Patent: Jul. 10, 2018

(54) METHOD AND SYSTEM FOR OPERATING A SET-TOP-BOX

(71) Applicant: ARRIS Global Ltd., West Yorkshire (GB)

(72) Inventors: David J. Laird, Greenacres, FL (US); Navin Anand, Coral Springs, FL (US)

(73) Assignee: ARRIS Global Ltd., Suwanee, GA (US)

( * ) Notice: Subject to any disclaimer, the term of this patent is extended or adjusted under 35 U.S.C. 154(b) by 358 days.

(21) Appl. No.: 14/300,549

(22) Filed: Jun. 10, 2014

(65) Prior Publication Data

US 2015/0015667 A1 Jan. 15, 2015

Related U.S. Application Data

(60) Provisional application No. 61/835,335, filed on Jun. 14, 2013.

(51) Int. Cl.
*H04N 13/00* (2018.01)
*G09G 5/00* (2006.01)
(Continued)

(52) U.S. Cl.
CPC ........... *H04N 13/0029* (2013.01); *G06F 3/14* (2013.01); *G09G 5/006* (2013.01); *H04N 13/0051* (2013.01); *H04N 13/0059* (2013.01); *H04N 13/0402* (2013.01); *H04N 13/0454* (2013.01); *H04N 13/0497* (2013.01);
(Continued)

(58) Field of Classification Search
None
See application file for complete search history.

(56) References Cited

U.S. PATENT DOCUMENTS

2006/0136764 A1* 6/2006 Munguia ............... G06F 1/3203
713/322
2008/0055464 A1* 3/2008 Shin ..................... H04N 5/4401
348/441
(Continued)

FOREIGN PATENT DOCUMENTS

EP 2393302 A1 12/2011
EP 2600623 A1 6/2013

OTHER PUBLICATIONS

"The Time Delay in Human Vision", D.A. Wardle, The Physics Teacher, vol. 36, Oct. 1998, p. 442-444.*
(Continued)

*Primary Examiner* — Janese Duley
(74) *Attorney, Agent, or Firm* — Stewart M. Wiener (57) ABSTRACT

A method for operating a set-top-box that supports 3D video content is disclosed. The method involves transmitting video content from an HDMI port of the set-top-box to a display device at a first resolution. The method also involves, in response to a change in the HDMI_Video_Format field or in the 3D_Structure field of an HDMI Vendor Specific InfoFrame, automatically switching to transmitting video content from the HDMI port of the set-top-box at a second resolution. The method also involves, after the switch to the second resolution, automatically switching back to transmitting video content from the HDMI port of the set-top-box at the first resolution in order to trigger a re-sync operation at the display device.

18 Claims, 10 Drawing Sheets

(51) Int. Cl.
*H04N 13/04* (2006.01)
*H04N 21/41* (2011.01)
*H04N 21/4363* (2011.01)
*H04N 21/81* (2011.01)
*G06F 3/14* (2006.01)
*G09G 3/00* (2006.01)

(52) U.S. Cl.
CPC ... *H04N 21/4122* (2013.01); *H04N 21/43635* (2013.01); *H04N 21/816* (2013.01); *G09G 3/003* (2013.01); *G09G 2340/0407* (2013.01); *G09G 2370/04* (2013.01); *G09G 2370/12* (2013.01)

(56) References Cited

U.S. PATENT DOCUMENTS

2009/0086089 A1* 4/2009 Matsui .................. H04N 7/015
   348/441
2012/0262546 A1* 10/2012 Tsukagoshi ........ H04N 13/0029
   348/43

OTHER PUBLICATIONS

Broberg, David K.; "Infrastructures for Home Delivery, Interfacing, Captioning, and Viewing of 3-D Content"; Proceedings of the IEEE, New York, vol. 99, No. 4; pp. 684-693; Apr. 1, 2011.
Extended European Search Report, 14171295, dated Oct. 14, 2014.
Hitachi, Ltd.; "High-Definition Multimedia Interface Specification", Version 1.4a Extraction of 3D Signaling Portion; HDMI Licensing, LLC; pp. 1-28; Mar. 4, 2010.

* cited by examiner

FIG. 1

| BYTE\BIT # | 7 | 6 | 5 | 4 | 3 | 2 | 1 | 0 |
|---|---|---|---|---|---|---|---|---|
| HB0 | PACKET TYPE = 0x81 ||||||||
| HB1 | VERSION = 0x01 ||||||||
| HB2 | 0 | 0 | 0 | LENGTH = Nv |||||

| PACKET BYTE # | 7 | 6 | 5 | 4 | 3 | 2 | 1 | 0 |
|---|---|---|---|---|---|---|---|---|
| PB0 | CHECKSUM ||||||||
| PB1 | 24BIT IEEE REGISTRATION IDENTIFIER (0x000C03) (LEAST SIGNIFICANT BYTE FIRST) ||||||||
| PB2 | ||||||||
| PB3 | ||||||||
| PB4 | HDMI_Video_Format ||| Rsvd (0) | Rsvd (0) | Rsvd (0) | Rsvd (0) | Rsvd (0) |
| (PB5) | (REFER TO HDMI SPECIFICATION VERSION1.4a) ||||||||
|  | 3D_Structure |||| RESERVED(0) ||||
| (PB6) | 3D_Ext_Data |||| RESERVED(0) ||||
| PB(Nv) | RESERVED(0) ||||||||

| VALUE [2...0] | DESCRIPTION |
|---|---|
| 000 | NO ADDITIONAL HDMI VIDEO FORMAT IS PRESENTED IN THIS PACKET |
| 001 | (REFER TO HDMI SPECIFICATION VERSION1.4a) 1 BYTE OF PARAMETER VALUE FOLLOWS. |
| 010 | 3D FORMAT INDICATION PRESENT. 3D_Structure, AND POTENTIALLY 3D_Ext_Data, FOLLOWS. |
| 011 ~ 111 | RESERVED FOR FUTURE USE |

METHOD AND SYSTEM FOR OPERATING A SET-TOP-BOX

CROSS-REFERENCE TO RELATED APPLICATIONS

This application is entitled to the benefit of provisional U.S. Patent Application Ser. No. 61/835,335, filed Jun. 14, 2013, which is incorporated by reference herein.

BACKGROUND

High definition (HD) broadcast video content is typically delivered to the home via a processing device commonly referred to as a set-top-box (STB). To provide a high quality viewing experience, the set-top-box and display device, e.g. an HD television, are often connected by a High-Definition Multimedia Interface (HDMI) link and video content is transmitted between the set-top-box and the HD television according to the HDMI specification as produced by a consortium of HDMI founders.

3-dimensional (3D) video content is now becoming more widely available to the public as content providers, set-top-box manufacturers, and television manufacturers provide more 3D content and more 3D capable equipment. The HDMI specification also has been updated to support 3D video content. However, it has been found in some 3D capable televisions that certain changes in the video content, e.g., a switch from 3D mode to 2D mode as the result of a channel change or an emergency alert system (EAS) activation, causes the displayed content to appear garbled and undecipherable.

SUMMARY

In accordance with an embodiment of the invention, a solution to the garbled picture problem in a 3D video system with an HDMI connected set-top box and display device involves programming the set-top-box to automatically and momentarily switch the resolution of the transmitted video content from a first resolution to a second resolution and then back to the first resolution in response to an insertion, change, or removal of certain HDMI-specific information in order to trigger the display device to re-sync itself. For example, upon detecting that an insertion, change, or removal of 3D_Structure information in an HDMI Vendor Specific InfoFrame has occurred or is about to occur, the set-top-box automatically and momentarily switches the resolution of the transmitted video content from 1080i to 720p and then back to 1080i or from 720p to 1080i and then back to 720p. The momentary resolution switch causes the display device to interpret a subsequent HDMI Vendor Specific InfoFrame and then re-sync with the received video content.

An embodiment of the invention is a method for operating a set-top-box that supports 3D video content. The method involves transmitting video content from an HDMI port of the set-top-box to a display device at a first resolution. The method also involves, in response to a change in the HDMI_Video_Format field or in the 3D_Structure field of an HDMI Vendor Specific InfoFrame, automatically switching to transmitting video content from the HDMI port of the set-top-box at a second resolution. The method also involves, after the switch to the second resolution, automatically switching back to transmitting video content from the HDMI port of the set-top-box at the first resolution in order to trigger a re-sync operation at the display device.

Another embodiment of the invention is a non-transitory storage medium that stores computer executable instructions, which when executed by a computer, implement a method for operating a set-top-box that supports 3D video content. The method involves transmitting video content from an HDMI port of the set-top-box to a display device at a first resolution. The method also involves, in response to a change in the HDMI_Video_Format field or in the 3D_Structure field of an HDMI Vendor Specific InfoFrame, automatically switching to transmitting video content from the HDMI port of the set-top-box at a second resolution. The method also involves, after the switch to the second resolution, automatically switching back to transmitting video content from the HDMI port of the set-top-box at the first resolution in order to trigger a re-sync operation at the display device.

Another embodiment of the invention is a set-top-box that supports 3D video content. The set-top-box includes an HDMI port, a processor, and memory. The memory stores computer executable instructions, which when executed by the computer, implements transmitting video content from the HDMI port of the set-top-box to a display device at a first resolution, in response to a change in the HDMI_Video_Format field or in the 3D_Structure field of an HDMI Vendor Specific InfoFrame, automatically switching to transmitting video content from the HDMI port of the set-top-box at a second resolution, and after the switch to the second resolution, automatically switching back to transmitting video content from the HDMI port of the set-top-box at the first resolution in order to trigger a re-sync operation at the display device.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIGS. 2A-2D depict the format of an HDMI Vendor Specific InfoFrame as described in the HDMI Specification Version 1.4a.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
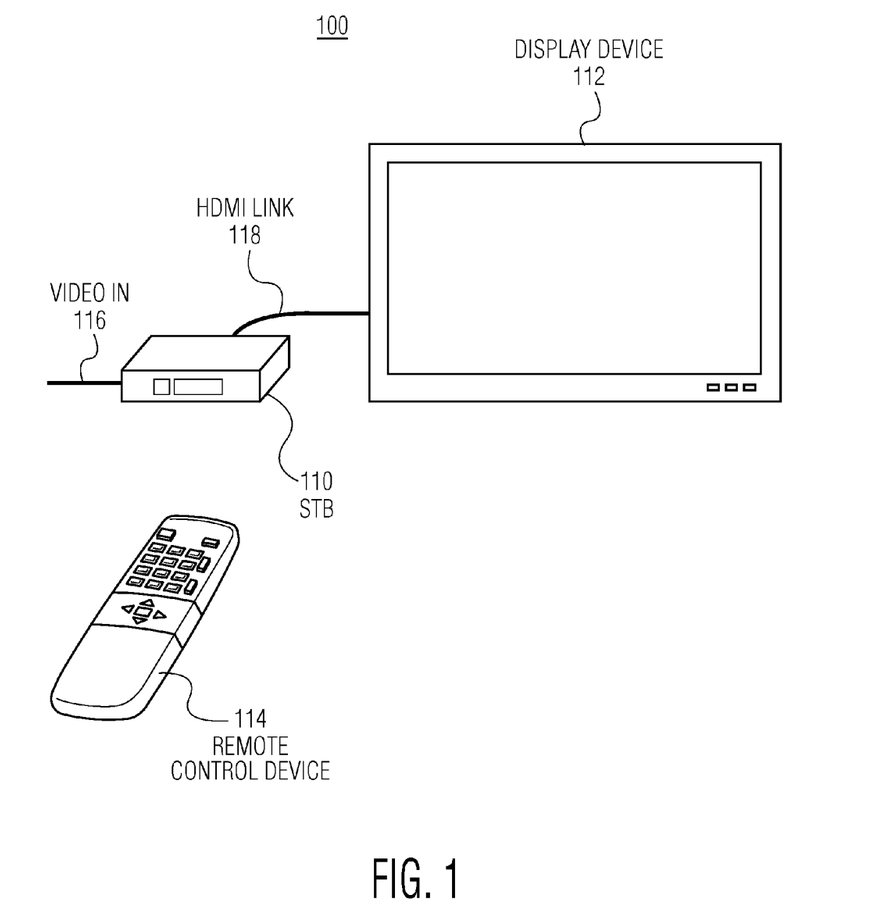
FIG. 1 depicts a video delivery system that includes a set-top-box, a display device, and a remote control device.

FIG. 1 depicts a video delivery system 100 that includes a set-top-box 110, a display device 112 (e.g., an HD television), and a remote control device 114. Set-top-boxes, display devices, and remote control devices are well known in the field and the known features of these devices are not described herein. In the embodiment of FIG. 1, the set-top-box receives incoming HD video content from an input line 116, which may receive the video content from, for example, a cable service provider, a satellite service provider, or another telecommunications service provider as is known in the field. The set-top-box is connected to the display device by an HDMI link 118. In the parlance of the HDMI specification, the set-top-box is referred to as a "source device" or "source" and the display device is referred to as a "sink device" or "sink." In the embodiment of FIG. 1, the video delivery system is configured to process HD video content that supports 3D viewing, referred to herein as 3D video content. Set-top-boxes and display devices that support the viewing of 3D video content are known in the field.

As described above, the set-top-box 110 and display device 112 are connected by the HDMI link 118. The HDMI protocol specifically addresses the handling of 3D video content in the HDMI Specification Version 1.4, dated Mar. 4, 2010 and incorporated by reference herein. In particular, the HDMI Specification Version 1.4a describes 3D signaling in Section 8. With particular reference to the current disclosure, Section 8.2.3 of the HDMI Specification Version 1.4a describes an HDMI Vendor Specific InfoFrame (VSI). HDMI Vendor Specific InfoFrames are used to specify the frame rate and resolution of the corresponding video signal, which defines the timing of the horizontal and vertical sync pulses. According to the HDMI specification, HDMI Vendor Specific InfoFrames are sent from the source device if the source device outputs a video signal that is defined in section 8.2.3. In particular, the specification requires that an accurate HDMI Vendor Specific InfoFrame be transmitted at least once per every two video fields. It is optional for the sink device to interpret every received HDMI Vendor Specific InfoFrame. That is, although the source device may be transmitting an HDMI Vendor Specific InfoFrame once per every two video fields, the sink device does not have to interpret (e.g., parse and read) every received HDMI Vendor Specific InfoFrame. The format of the HDMI Vendor Specific InfoFrames is described in more detail below with reference to FIGS. 2A-2D.

Figure 2A:
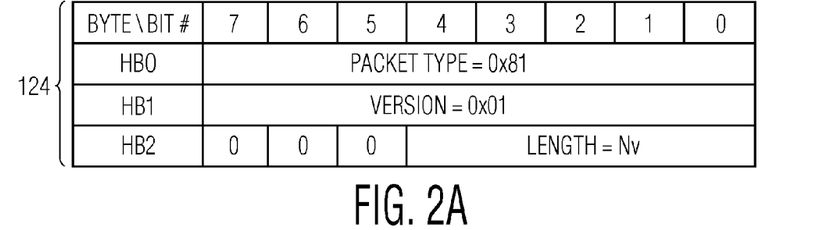

FIG. 2A depicts the format of the HDMI Vendor Specific InfoFrame header 124. As shown in FIG. 2A, header byte zero (HB0) is a field used to identify the packet type, HB1 is a field used to define the protocol version number, and HB2 includes a 5-bit length field that is used to define the length of the HDMI Vendor Specific InfoFrame.

Figure 2B:
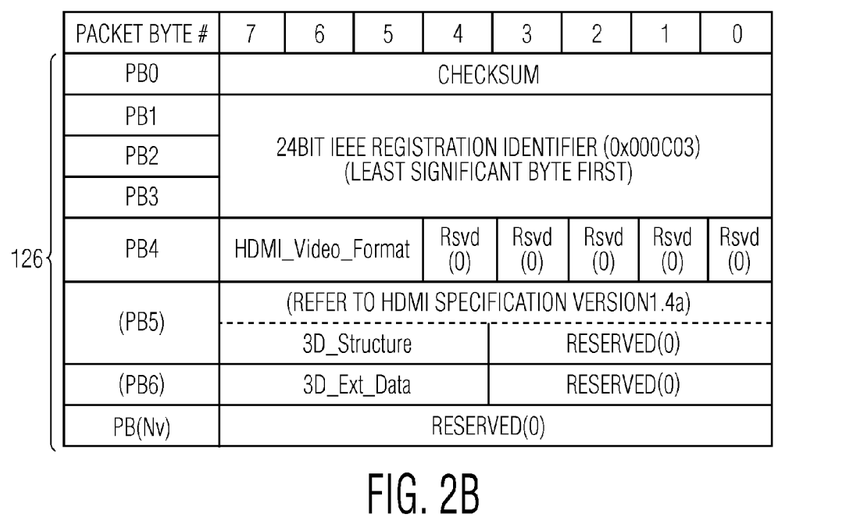

FIG. 2B depicts the format of the HDMI Vendor Specific InfoFrame content 126, or body. As shown in FIG. 2B, packet byte zero (PB0) is a field that is used to identify a checksum. PB1-PB3 is a field that is used to identify a 24-bit IEEE registration identifier. PB4 includes a 3-bit field, "HDMI_Video_Format," to identify the structure of extended video formats exclusively defined within the HDMI specification, and 5 bits that are reserved. PB5 includes an 8-bit field that is defined in the HDMI Specification Version 1.4a, a 4-bit field, "3D_Structure," to identify the transmission format of 3D video data, and 4 reserved bits. PB6 includes a 4-bit field, "3D_Ext_Data," whose meaning is dependent on the value of the 3D_Structure field as described in the specification and 4 reserved bits.

Figure 2C:
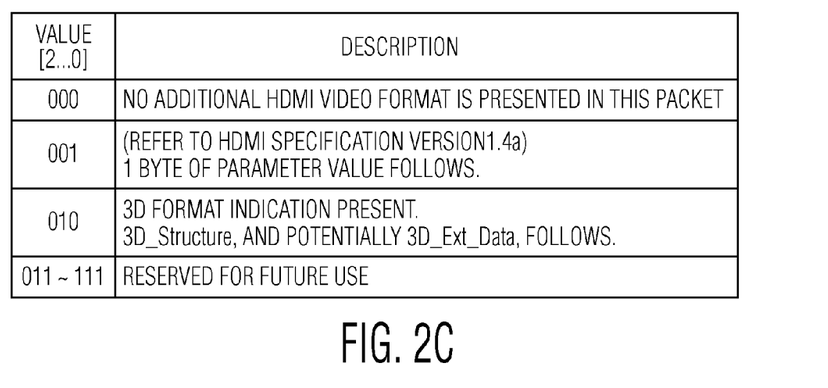

FIG. 2C is a table that indicates the values and corresponding description of the HDMI_Video_Format field of the HDMI Vendor Specific InfoFrame. As shown in FIG. 2C, the value "000" indicates that no additional HDMI video format is presented in this packet, the value "001" indicates that a 1-byte parameter follows (Refer to HDMI Specification Version 1.4a), the value "010" indicates that a 3D format is present and that 3D_Structure information and potentially 3D_Ext_Data information follows, and the values "011~111" are reserved for future use.

Figure 2D:
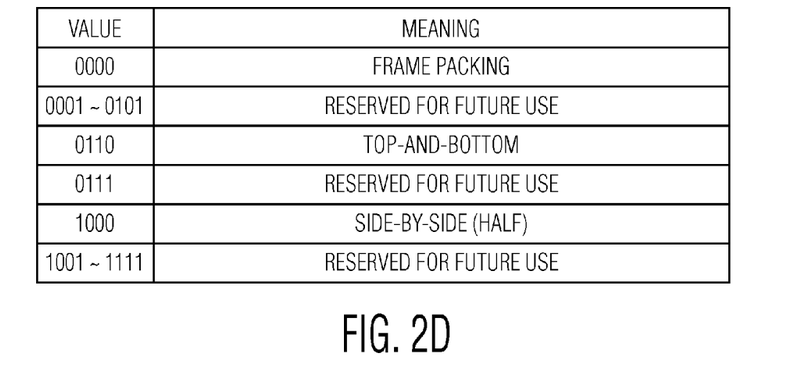

FIG. 2D is a table that indicates the values and corresponding description of the 3D_Structure field of the HDMI Vendor Specific InfoFrame. The value "0000" indicates the "Frame Packing" structure described in the specification, the values "0001~0101" are reserved for future use, the value "0110" indicates the "Top-and-Bottom" structure described in the specification, the value "0111" is reserved for future use, the value "1000" indicates the "Side-by-Side (Half)"

structure described in the specification and the value values "1001~1111" are reserved for future use.

Using the above provided protocol, 3D_Structure information is carried in the 3D_Structure field when the HDMI_Video_Format field of the HDMI Vendor Specific InfoFrame has the value "010." In the description that follows, 3D_Structure information can be considered to be "inserted into" a transmitted video stream, "changed" from a previous value, or "removed from" the transmitted video stream.

The 3D structure information is considered to be "inserted into" a transmitted stream of video content when the HDMI_Video_Format field of a next transmitted HDMI Vendor Specific InfoFrame is set to "010" after the previously transmitted HDMI Vendor Specific InfoFrames were set to some other value, most likely to "000." That is, the setting of the HDMI_Video_Format for a next HDMI Vendor Specific InfoFrame to "010" causes the next HDMI Vendor Specific InfoFrame to include a value in the 3D_Structure field that defines the transmission format of 3D video content. For example, 3D_Structure information is inserted into a transmitted video stream when a 3D mode is activated or when the channel is changed from a 2D channel to a 3D channel.

The 3D_Structure information is considered to be "changed" when the value of the 3D_Structure field of a next HDMI Vendor Specific InfoFrame is changed from one of the values shown in FIG. 2D to a different one of the values shown in FIG. 2D. For example, 3D_Structure information is changed when a different type of 3D mode is selected.

The 3D_Structure information is considered to be "removed from" a transmitted stream of video content when the HDMI_Video_Format field of a next transmitted HDMI Vendor Specific InfoFrame is set to, for example, "000," after the previously transmitted HDMI Vendor Specific InfoFrames were set to "010." For example, 3D_Structure information is removed from a transmitted video stream when the set-top-box is switched from a 3D mode to a 2D mode. A switch from a 3D mode to a 2D mode may occur because of, for example, a channel change or an activation of an emergency alert system (EAS).

In order for the display device to properly decode the received video content and display a clear picture, the display device must be operating in sync with the received data. For example, the display device must be synchronously decoding the received video content according to the protocol (2D or 3D) and format (3D formats: Frame Packing, Top-and-Bottom, or Side-by-Side (Half)) as indicated in the HDMI_Video_Format and 3D_Structure fields of the HDMI Vendor Specific InfoFrames. However, it has been observed that certain display devices do not always recognize a change in the stream of HDMI Vendor Specific InfoFrames that involves an insertion, change, or removal (insert/change/remove) of the 3D_Structure field. If a display device does not recognize an insertion, change, or removal of the 3D_Structure field in a transmitted stream of video content, the display device will not be able to properly decode and display the video content. For example, the processor of the display device will not be decoding the received video according to the HDMI_Video_Format and 3D_Structure information that corresponds to the received video content and therefore the picture will not be properly displayed.

Figure 3:
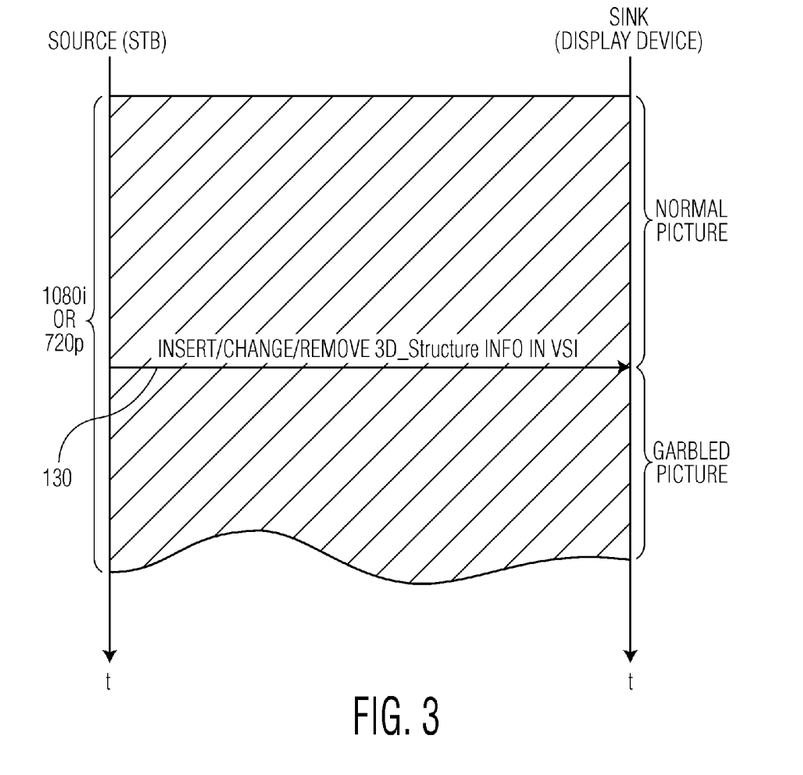
FIG. 3 illustrates a case in which an insertion, change, or removal of the 3D_Structure field in HDMI Vendor Specific InfoFrames of transmitted video content causes the display device to improperly decode and display received video content.

FIG. 3 illustrates a case in which an insertion, change, or removal of the 3D_Structure field of the transmitted video content causes the display device to improperly decode and display the received video content. With reference to FIG. 3, video content is transmitted from a source device (i.e., a set-top-box) to a sink device (i.e., an HD television) in either 1080i or 720p resolution. Initially, the display device is in sync with the information in the HDMI Vendor Specific InfoFrames and the video content is being properly decoded and displayed. At some point in time 130, 3D_Structure information is inserted into, changed, or removed from the HDMI Vendor Specific InfoFrames. For example, the 3D mode is initiated (inserted), the 3D mode is changed (e.g., from Frame Packing to Top-and-Bottom), or the channel is changed from a 3D channel to a 2D channel (removed).

As has been observed, the insertion, change, or removal of the 3D_Structure field may cause the display device to display a garbled picture. It is most likely the case that the sink device is not interpreting the HDMI Vendor Specific InfoFrames that are received subsequent to the insertion, change, or removal of the 3D_Structure information. As stated above, the HDMI specification makes it optional to interpret every HDMI Vendor Specific InfoFrame and it is likely that some display devices simply do not interpret every HDMI Vendor Specific InfoFrame and updated the stored state in the processor and therefore become out of sync with the received video content.

The fact that an insertion, change, or removal of the 3D_Structure information can cause some display devices to malfunction is a serious impediment to the widespread adoption of 3D programming. Additionally, this type of malfunction is typically perceived as a problem with the 3D video content service provider, e.g., the cable or satellite service provider, which will cause an increase in customer service inquiries and a decrease in customer satisfaction.

One possible solution to the above-described problem is to ensure that each display device is configured to interpret each and every HDMI Vendor Specific InfoFrame so that any insertion, change, or removal of 3D_Structure information is instantly recognized by the display device. However, with so many different display device manufacturers and the lead time involved in the development of such display devices, a solution that requires a change in the display devices themselves is difficult to implement in a timely manner. Additionally, such a solution is out of the hands of the video content service providers, e.g., the cable and satellite service providers, which are the parties most often at the frontlines dealing directly with customer inquiries.

In searching for a solution to this problem, it has been found quite unexpectedly that a change in the resolution of the transmitted video content, for example, a change from 1080i to 720p or a change from 720p to 1080i, causes most any display device to instantly start interpreting the HDMI Vendor Specific InfoFrames that are received. It is believed that the change in the resolution triggers the decoder in the display device to interpret (e.g., parse and read) a subsequent HDMI Vendor Specific InfoFrame and to update its stored state accordingly, which state indicates the type and format of content that is expected to be received at the display device, e.g., to "re-sync" with the received video content.

In view of the above-described unexpected finding and in accordance with an embodiment of the invention, a solution to the garbled picture problem in a 3D video system with an HDMI connected set-top box and display device involves programming the set-top-box to automatically and momentarily switch the resolution of the transmitted video content from a first resolution to a second resolution and then back to the first resolution in response to an insertion, change, or removal of 3D_Structure information in order to trigger the display device to re-sync itself. For example, upon detecting that an insertion, change, or removal of 3D_Structure information in an HDMI Vendor Specific InfoFrame has occurred or is about to occur, the set-top-box automatically and momentarily switches the resolution of the transmitted video content from 1080i to 720p and then back to 1080i or from 720p to 1080i and then back to 720p. The momentary resolution switch causes the display device to interpret a subsequent HDMI Vendor Specific InfoFrame and to re-sync with the received video content, e.g., to update its stored state to correspond to the type and format of video content that is actually being received at the display device. The above-described technique can be implemented entirely at the set-top-box and therefore can be rapidly deployed by a service provider, e.g., a cable or satellite service provider, without having to wait for a fix from the display device manufacturers. For example, the above-described solution can be deployed to an installed base of set-top-boxes via a software update that is delivered to the set-top-boxes via the existing service provider infrastructure.

Figure 4A:
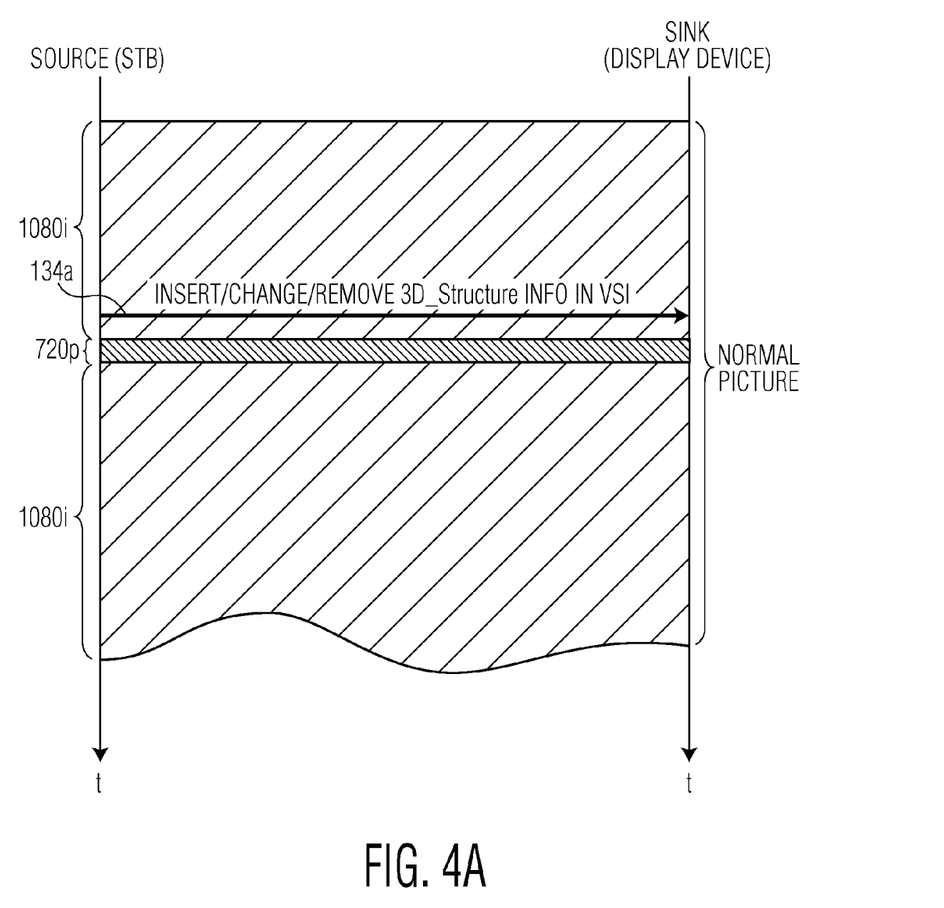
FIGS. 4A-4D illustrate implementations of set-top-box controlled resolution switching in response to an insertion, change, or removal of 3D_Structure information in HDMI Vendor Specific InfoFrames of a video system in accordance with embodiments of the invention.

FIG. 4A illustrates an implementation of set-top-box controlled resolution switching in response to an insertion, change, or removal of 3D_Structure information in HDMI Vendor Specific InfoFrames of a video system. With reference to FIG. 4A, video content is transmitted from a source device, i.e., a set-top-box, to a sink device, i.e., an HD television, in, for example, 1080i resolution. The display device is in sync with the information in the HDMI Vendor Specific InfoFrames and the video content is properly decoded and displayed by the display device. At some point in time, 134a, 3D_Structure information is inserted into, changed, or removed from the HDMI Vendor Specific InfoFrames that are sent at least once per two video fields. Upon detecting a change in the HDMI Vendor Specific InfoFrames, the set-top-box automatically switches the resolution of the video content from 1080i to 720p and then back to 1080i as indicated in FIG. 4A by the cross-hatching. For example, the switch happens immediately after the change is detected (e.g., on the order of milliseconds or tens of milliseconds) and lasts for at least long enough to send an HDMI Vendor Specific InfoFrame with updated HDMI_Video_Format and/or 3D_Structure information. In an embodiment, the momentary switch to the second resolution lasts for less than one second. The momentary switch from the first resolution to the second resolution and then back to the first resolution causes the display device to interpret a subsequent HDMI Vendor Specific InfoFrame and to update its stored state accordingly, thereby providing a fix to the problem. In an embodiment, the momentary resolution switch lasts for such a short period of time that the resolution switch is imperceptible to the viewer.

Figure 4B:
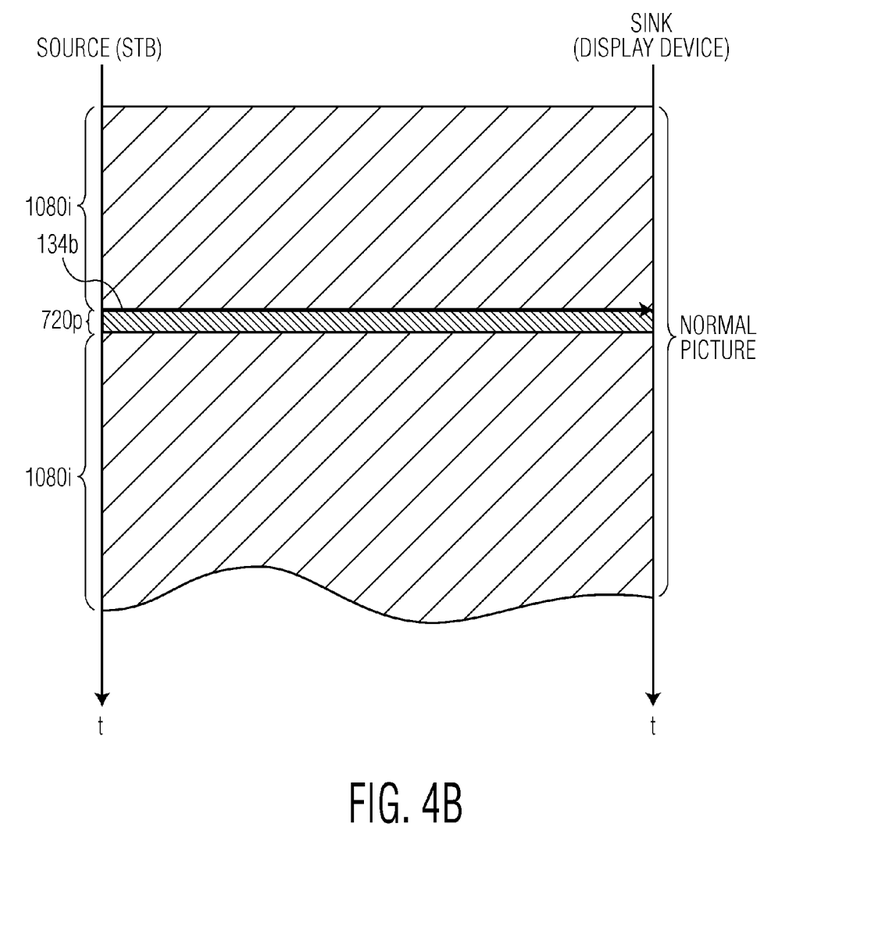
Figure 4C:
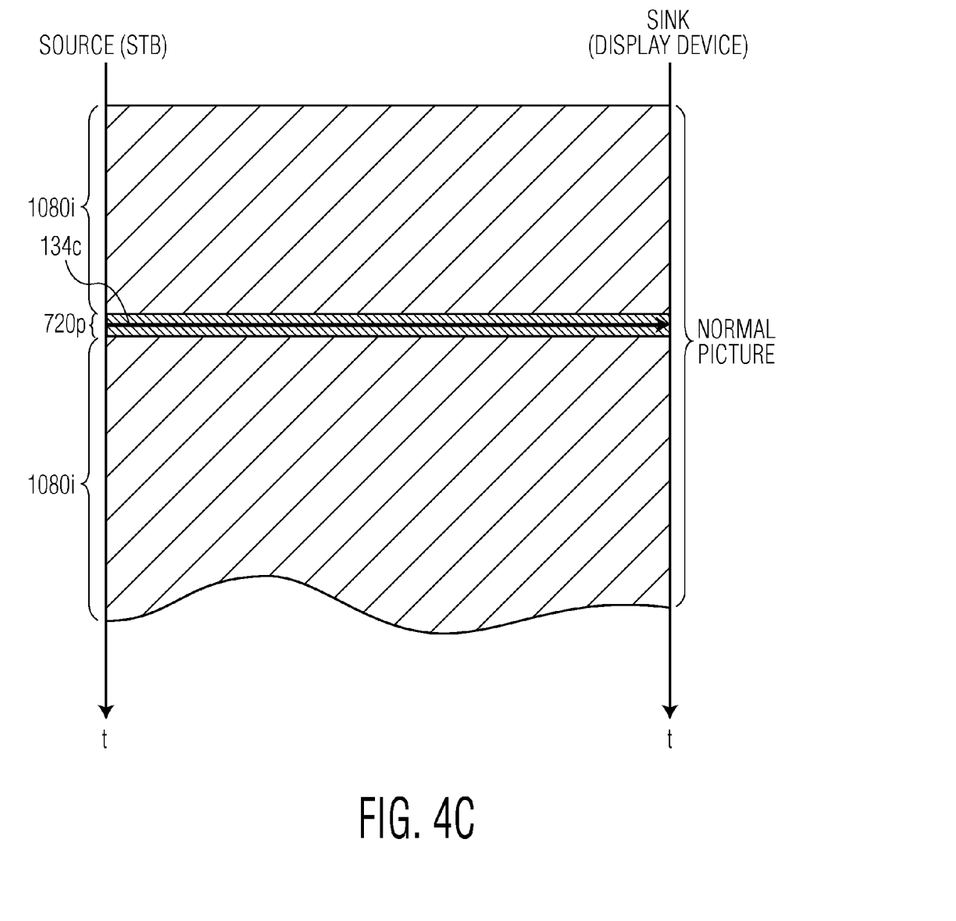
Figure 4D:
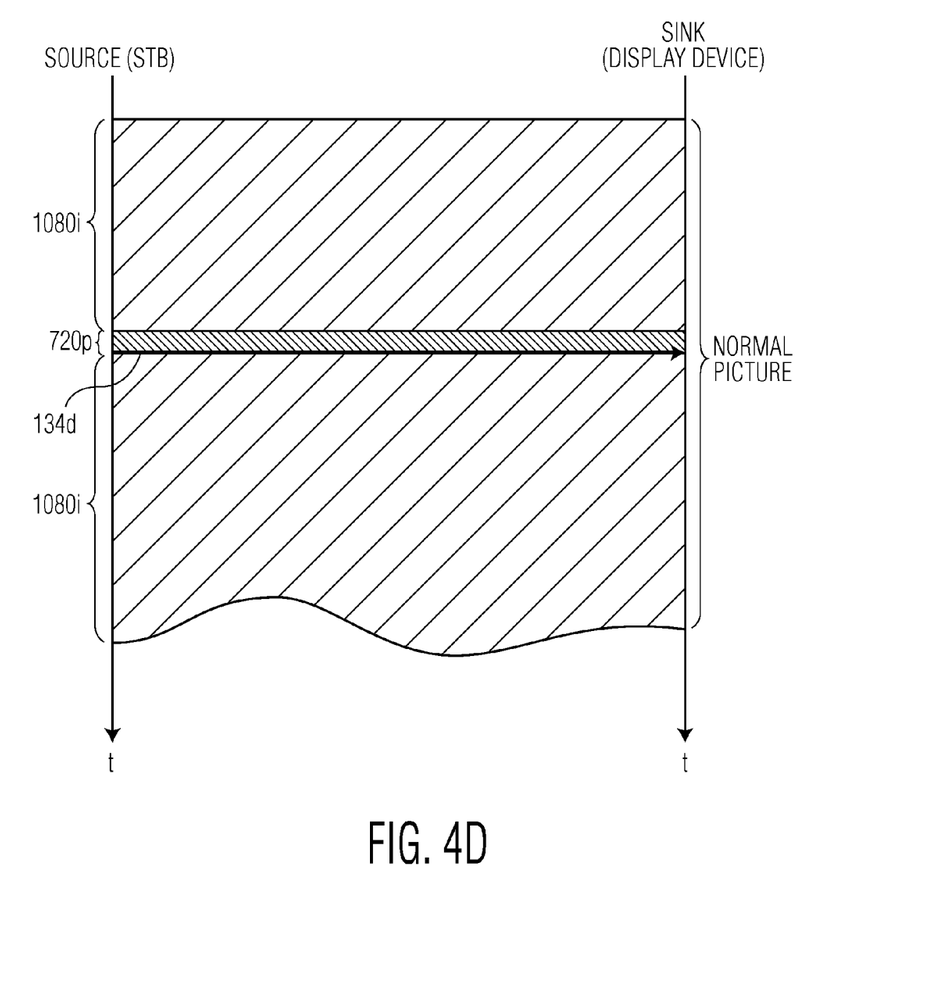

In the embodiment described with reference to FIG. 4A, an HDMI Vendor Specific InfoFrame with a change in the HDMI_Video_Format field or in the 3D_Structure field is transmitted to the display device before the switch to the second resolution occurs. In other embodiments, an HDMI Vendor Specific InfoFrame with a change in the HDMI_Video_Format field or in the 3D_Structure field is transmitted to the display device in parallel with the switch to the second resolution, after the switch to the second resolution and before the switch back to the first resolution, or in parallel with the switch back the first resolution. FIG. 4B illustrates an embodiment in which an HDMI Vendor Specific InfoFrame with a change in the HDMI_Video_Format field or in the 3D_Structure field is transmitted to the display device in parallel with the switch to the second resolution (as indicated by arrow 134b). FIG. 4C illustrates an embodiment in which an HDMI Vendor Specific InfoFrame with a change in the HDMI_Video_Format field or in the 3D_Structure field is transmitted to the display device after the switch to the second resolution and before the switch back to the first resolution (as indicated by arrow 134c). FIG. 4D illustrates an embodiment in which an HDMI Vendor Specific InfoFrame with a change in the HDMI_Video_Format field or in the 3D_Structure field is transmitted to the display device in parallel with the switch back the first resolution (as indicated by arrow 134d). These various embodiments can be implemented, for example, when the set-top-box knows in advance that a change in the HDMI_Video_Format field or in the 3D_Structure field is about to take place. In an embodiment, a change in the HDMI Vendor Specific InfoFrame and a resolution switch are in parallel when they occur nearly simultaneous to each other, e.g., on the order of within milliseconds of each other.

Figure 5:
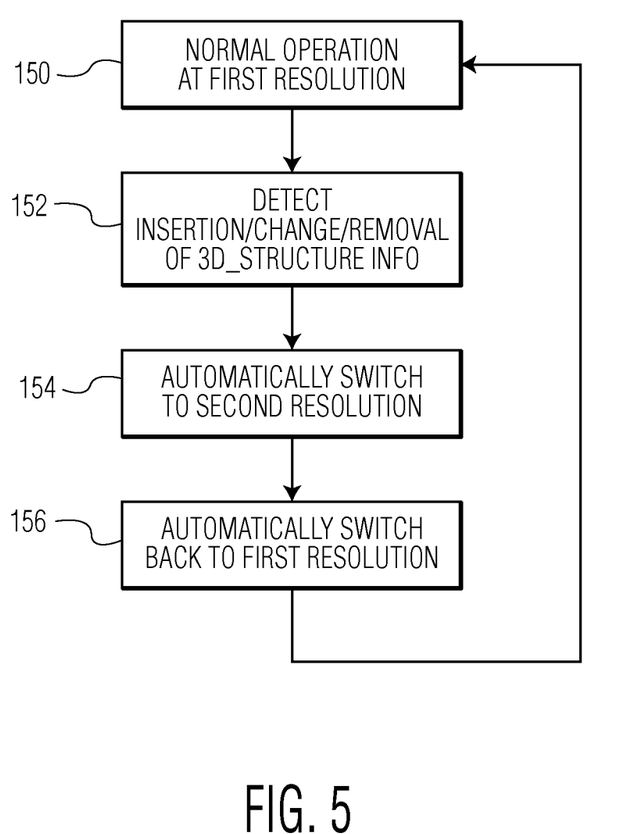
FIG. 5 is a process flow diagram of a method for operating a set-top-box that supports 3D video content in accordance with an embodiment of the invention.

FIG. 5 is a process flow diagram of a method for operating a set-top-box that supports 3D video content. At block 150, the set-top-box is in a normal operation mode in which video content is transmitted at a first resolution, e.g., a desired resolution of 1080i. At block 152, the set-top-box detects that an insertion, change, or removal of 3D_Structure information of an HDMI Vendor Specific InfoFrame has occurred or is going to occur. At block 154, the resolution of the video content transmitted from the set-top-box is automatically switched from the first resolution to a second resolution, e.g., from 1080i to 720p. At block 156, the resolution of the video content transmitted from the set-top-box is automatically switched back to the first resolution, e.g., from 720p to 1080i, and the process returns to block 150.

In an embodiment, an insertion, change, or removal of the 3D_Structure information is detected at the set-top-box by monitoring memory fields that store the current values of the HDMI_Video_Format field and the 3D_Structure field of the most recently transmitted HDMI Vendor Specific InfoFrame. For example, memory fields are configured within the set-top-box to store the current values of the HDMI_Video_Format field and the 3D_Structure field of the most recently transmitted HDMI Vendor Specific InfoFrame. Additionally, computer readable instructions of the set-top-box are configured to continuously monitor the values of the memory fields and to implement the resolution switching in response to a change in the one or both of the values of the memory fields. Examples of changes in the values of the memory fields that would trigger the resolution switching are provided below:

1) Insertion: HDMI_Video_Format field: "000"→"010";
2) Change: 3D_Structure field: "0000"→"0110" or "0110"→"1000"; and
3) Removal: HDMI_Video_Format field: "010"→"000".

In an embodiment, the resolution switching is automatic in the sense that the user of the set-top-box does not have to take any specific action to switch the resolution. Rather, the resolution switching is a byproduct of some other action/event. For example, the resolution switching is a result of the user activating a 3D mode, a change in the transmission format of the 3D video content, or a change from 3D mode to 2D or a change from a 3D channel to a 2D channel, for example, in the event of an EAS activation. As used herein, the term "resolution" refers to the pixel density of the video content and could also or alternatively refer to field and/or frame rates. Additionally, although the resolutions of 1080i and 720p are given as examples, other resolutions are possible as long as the transmitted video content is switched from a first resolution to a second resolution that is different from the first resolution.

Figure 6:
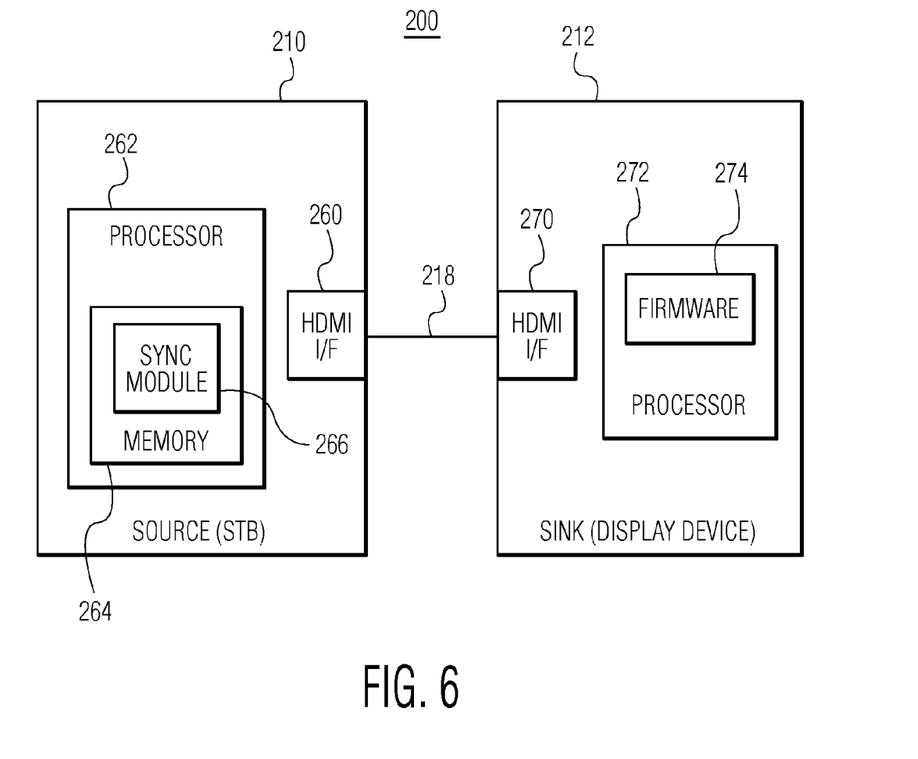
FIG. 6 depicts an expanded view of a set-top-box and a display device, in which the set-top-box is configured to implement resolution switching in accordance with an embodiment of the invention.

In an embodiment, the resolution switching technique is implemented via computer executable instructions that are stored in memory of the set-top-box and executed by a processor of the set-top-box. FIG. 6 depicts an expanded view of a video system 200 that includes a set-top-box 210 and a display device 212 in which the set-top-box is configured to implement resolution switching in accordance with an embodiment of the invention. With reference to FIG. 6, the set-top-box is configured to support 3D video content and includes an HDMI interface 260, a processor 262, and memory 264 that stores a sync module 266, which includes computer executable instructions to implement the resolution switching technique as described above with reference to FIGS. 4 and 5. The display device is configured to support 3D video content and includes an HDMI interface 270, a processor 272, and firmware 274. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The process executes computer readable instructions stored in the memory to implement various tasks as described above. In an embodiment, state information that indicates the type and format of expected content is stored in memory of the processor. Such state information may be considered as part of the firmware of the display device. Additionally, the HDMI interfaces 260 and 270 are standard HDMI interfaces as described in the HDMI specification and the HDMI interfaces are connected by an HDMI cable 218 with HDMI connectors on both ends.

Figure 7:
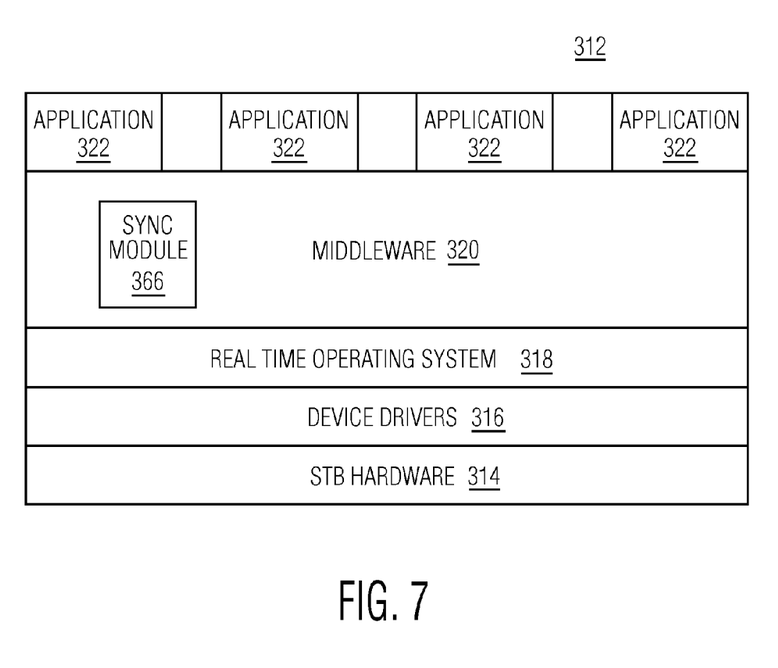
FIG. 7 is hierarchical block diagram of a set-top-box architecture in which middleware is configured to implement resolution switching in accordance with an embodiment of the invention.

In an embodiment, the resolution switching technique is implemented via computer executable code that is part of the "middleware" of the set-top-box. For example, middleware in a television service provider environment that utilizes a set-top-box at the customer premises is software that runs between the device drivers and operating system of the set-top-box and the applications (e.g., electronic program guide (EPG), pay-per-view (PPV), video-on-demand (VOD), interactive TV, shopping), which run on the set-top-box. FIG. 7 is hierarchical block diagram of the architecture of a set-top-box 312, in which the hardware 314 of the set-top-box is at the lowest level, device drivers 316 are at the next highest level, a real-time operating system 318 is at the next highest level, middleware 320 is at the next highest level, and applications 322 are at the next highest level. As depicted in FIG. 7, a sync module 366 is embodied within the computer executable instructions of the middleware. For example, the sync module is a collection of computer executable code (which is stored and executed by the set-top box hardware) that is configured to implement the resolution switching technique as described above with reference to FIGS. 4 and 5. Although the sync module is embodied in the middleware, it is possible that the sync module could be embodied in some other manner, for example, within the computer readable instructions of any portion of the software stack, which may include, for example, the middleware, the operating system, or the device drivers or a combination thereof.

In an embodiment, although the resolution of the transmitted video content is changed, the program (i.e., a sitcom, news show, or sporting event) stays the same. That is, the program that is being transmitted does not change during the resolution switching, only the resolution of the transmitted video content.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing computer executable instructions, or program code, for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a set-top-box that supports 3-dimensional (3D) video content, the method comprising:
    transmitting video content from an HDMI port of the set-top-box to a display device at a first resolution; and
    in response to a change in a respective one of the HDMI_Video_Format field and the 3D_Structure field of an HDMI Vendor Specific InfoFrame, the change comprising difference in a value of the respective field relative to a previous value of the respective field in a previously transmitted HDMI Vendor Specific InfoFrame:
        automatically switching to transmitting video content from the HDMI port of the set-top-box at a second resolution, wherein the second resolution is different from the first resolution, and after the switch to the second resolution, automatically switching back to transmitting video content from the HDMI port of the set-top-box at the first resolution, wherein the steps of automatically switching and automatically switching back are performed sequentially in a time period of less than one second, for triggering a re-sync operation at the display device that causes the display device to interpret a next subsequently received HDMI Vendor Specific InfoFrame and to update a stored state according to the subsequently received HDMI Vendor Specific InfoFrame, and wherein the time period has a duration that is selected for causing the automatically switching and the automatically switching back to be visually imperceptible to a human eye.

2. The method of claim 1, further comprising detecting the change by monitoring a memory field in the set-top-box.

3. The method of claim 1, wherein the step of automatically switching the resolution to the second resolution takes place after the HDMI Vendor Specific InfoFrame having the change is transmitted to the display device.

4. The method of claim 1, further comprising:
in parallel with the automatically switching to transmitting video content from the HDMI port of the set-top-box at the second resolution, transmitting to the display device the HDMI Vendor Specific InfoFrame having the change.

5. The method of claim 1, further comprising:
transmitting to the display device the HDMI Vendor Specific InfoFrame having the change, wherein the transmitting takes place after the resolution is automatically switched to the second resolution but before the resolution is automatically switched back to the first resolution.

6. The method of claim 1, further comprising:
in parallel with the automatically switching back, transmitting to the display device the HDMI Vendor Specific InfoFrame having the change.

7. The method of claim 1, wherein the first resolution is 1080i and the second resolution is 720p.

8. The method of claim 1, wherein the first resolution is 720p and the second resolution is 1080i.

9. A non-transitory storage medium that stores computer executable instructions which, when executed by a computer, configure the computer to implement steps of a method for operating a set-top-box that supports 3-dimensional (3D) video content, the steps comprising:
transmitting video content from an HDMI port of the set-top-box to a display device at a first resolution; and
in response to a change in a respective one of the HDMI_Video_Format field and the 3D_Structure field of an HDMI Vendor Specific InfoFrame, the change comprising difference in a value of the respective field relative to a previous value of the respective field in a previously transmitted HDMI Vendor Specific InfoFrame:
automatically switching to transmitting video content from the HDMI port of the set-top-box at a second resolution, and
after the switch to the second resolution, automatically switching back to transmitting video content from the HDMI port of the set-top-box at the first resolution,
wherein the steps of automatically switching and automatically switching back are performed sequentially in a time period of less than one second, to trigger a re-sync operation at the display device that causes the display device to interpret a next subsequently received HDMI Vendor Specific InfoFrame and to update a stored state according to the subsequently received HDMI Vendor Specific InfoFrame, and
wherein the time period has a duration that is selected for causing the automatically switching and the automatically switching back to be visually imperceptible to a human eye.

10. The non-transitory storage medium of claim 9, the steps further comprising:
detecting the change by monitoring a memory field in the set-top-box.

11. The non-transitory storage medium of claim 9, wherein the first resolution is 1080i and the second resolution is 720p.

12. The non-transitory storage medium of claim 9, wherein the first resolution is 720p and the second resolution is 1080i.

13. A set-top-box that supports 3-dimensional (3D) video content, the set-top-box comprising:
an HDMI port;
a processor communicatively coupled to the HDMI port;
a memory storage device, communicatively coupled to the processor, that stores computer executable instructions which, when executed by the processor, configure the processor to:
transmit video content from the HDMI port of the set-top-box to a display device at a first resolution; and
in response to a change in a respective one of the HDMI_Video_Format field and the 3D_Structure field of an HDMI Vendor Specific InfoFrame, the change comprising difference in a value of the respective field relative to a previous value of the respective field in a previously transmitted HDMI Vendor Specific InfoFrame:
automatically switch to transmitting video content from the HDMI port of the set-top-box at a second resolution, and
after the switch to the second resolution, automatically switch back to transmitting video content from the HDMI port of the set-top-box at the first resolution,
wherein the automatically switching and automatically switching back are performed sequentially in a time period of less than one second, to trigger a re-sync operation at the display device that causes the display device to interpret a next subsequently received HDMI Vendor Specific InfoFrame and to update a stored state according to the subsequently received HDMI Vendor Specific InfoFrame, and
wherein the time period has a duration that is selected for causing the automatically switching and the automatically switching back to be visually imperceptible to a human eye.

14. The set-top-box of claim 13, wherein the change is detected by monitoring a memory field in the set-top-box.

15. The set-top-box of claim 13, wherein the first resolution is 1080i and the second resolution is 720p.

16. The set-top-box of claim 13, wherein the first resolution is 720p and the second resolution is 1080i.

17. The set-top-box of claim 14, wherein the computer executable instructions comprise middleware of the set-top-box.

18. A method for operating a set-top-box that supports 3-dimensional (3D) video content, the method comprising:
- transmitting video content from an HDMI port of the set-top-box to a display device; and
- at the set-top-box, implementing a momentary and automatic resolution switch in transmission of the video content, for triggering a re-sync operation at the display device that causes the display device to interpret a next subsequently received HDMI Vendor Specific InfoFrame and to update a stored state according to the subsequently received HDMI Vendor Specific InfoFrame;
- wherein the implementing is in response to a change in a respective one of the HDMI_Video_Format field and the 3D_Structure field of an HDMI Vendor Specific InfoFrame, the change comprising difference in a value of the respective field relative to a previous value of the respective field in a previously transmitted HDMI Vendor Specific InfoFrame; and
- wherein the implementing comprises:
  - automatically switching from transmitting the video content at a first resolution to transmitting the video content at a second resolution, and
  - automatically switching back to transmitting the video content at the first resolution,
  - wherein the steps of automatically switching and automatically switching back are performed sequentially in a time period of less than one second, and
  - wherein the time period has a duration that is selected for causing the automatically switching and the automatically switching back to be visually imperceptible to a human eye.

* * * * *